United States Patent Office 3,294,988
Patented Dec. 27, 1966

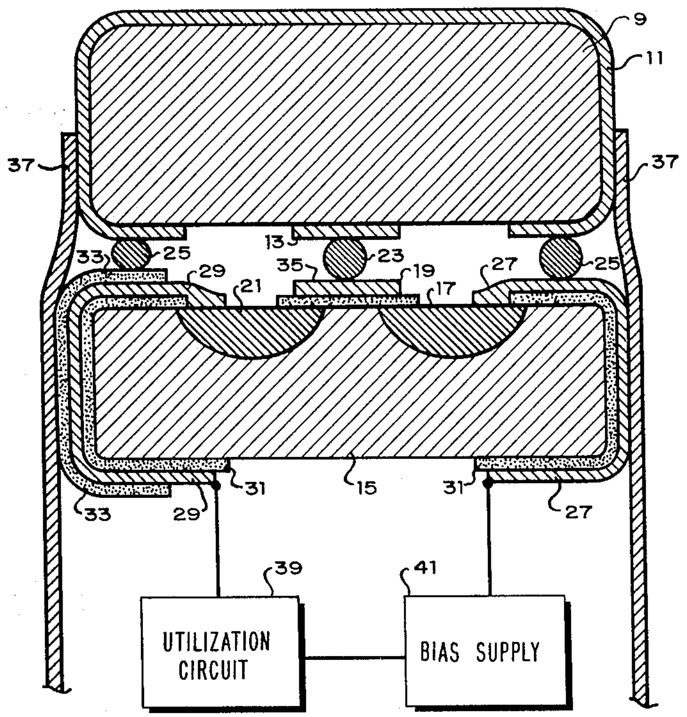
INVENTOR
DAVID PACKARD
BY A. C. Smith
ATTORNEY

3,294,988

TRANSDUCERS

David Packard, Los Altos Hills, Calif., assignor to Hewlett-Packard Company, Palo Alto, Calif., a corporation of California Filed Sept. 24, 1964, Ser. No. 398,977
4 Claims. (Cl. 310—8)

This invention relates to a solid state transducer which uses a pyroelectric or piezoelectric crystal combined with a field-effect transistor to produce high level electrical signals related to temperature or pressure in the region about the transducer. A transducer of this type may be made sufficiently small to be inserted into the body of a patient at the end of a catheter for measuring biophysical pressures or temperatures.

Accordingly, it is an object of the present invention to provide miniature semiconductor pressure and temperature transducers which produce high level signals related to these physical conditions in an environment under examination.

It is another object of the present invention to provide pressure-to-electrical signal transducers and temperature-to-electrical signal transducers which are unaffected by biophysical electrical signals.

It is still another object of the present invention to provide improved solid state transducers which produce electric signals related to physical conditions under examination.

In accordance with the illustrated embodiment of the present invention, a piezoelectric or pyroelectric crystal is attached to the insulated gate electrode of a field-effect transistor. The charge produced on the surface electrodes of the crystal in response to a physical condition such as pressure or temperature which is being measured controls the conductivity of the field-effect transistor which in turn controls the flow of current in an external circuit. Signal amplification provided by the transistor together with the shielding on the surfaces of the transducer serve to produce a high level, low noise output signal which is relatively unaffected by external electrical signals.

Other and incidental objects of the present invention will be apparent from a reading of this specification and an inspection of the accompanying drawing which shows a cross-sectional view of a transducer according to the present invention.

Referring to the drawing, there is shown a crystal 9 of pyroelectric or piezoelectric material having an electrically conductive shield 11 disposed on its upper and side surfaces and having an electrode 13 disposed on its lower surface. The semiconductor body 15 of a field-effect transistor (say of silicon material) including a source electrode 17, a gate electrode 19 and a drain electrode 21 is positioned near the lower surface of the crystal 9 with the gate electrode 19 electrically contacting the electrode 13 on crystal 9 through conductive bead 23. A conductive ring 25 connects the lead 27 attached to the source electrode 17 and the shield 11 which serves as the other electrode for crystal 9. Electrical connection to the drain electrode 21 is provided through the lead 29 which is attached to the drain electrode 21 and which is insulated from the body 15 by a layer 31 of insulating material such as an oxide of silicon. The insulating layer 33 on lead 29 prevents the drain electrode 21 from being shorted to the source electrode 17 through the conductive ring 25 and shield 11. The crystal 9 and transistor 15 are hermetically sealed together by the conductive ring 25 and the assembled transducer is mounted at the end of a catheter tube 37 or other structure to form a probe which can be inserted into the body of a patient to measure physical conditions at a test point.

The crystal 9, which may be quartz or barium titanate (or any other material which produces a signal in response to a selected physical condition), produces charge on the shield-electrode 11 and the electrode 13 in response to the physical condition being measured. This charge is applied to the gate electrode 19 through bead 23 and to the source electrode 17 through the ring 25 and lead 27. The gate electrode 19 is insulated from the body 15 by a layer 35 of insulating material such as silicon dioxide so that charge on the gate electrode 19 cannot leak off readily. The source and drain electrodes 17 and 21 are of conductivity type opposite to the conductivity type of the body 15. Thus, each of the source electrode 17 and drain electrode 21 forms a P–N junction with the body 15. The external circuit including utilization circuit 39 and bias supply 41 connected between the source and drain electrodes 17 and 21 reverse biases one of the two junctions. In the absence of a surface conduction path electrically connecting the source and drain electrodes, the transistor is in the off-state and the impedance of the path between the source and drain electrodes is high (typically hundreds of megohms). This source-drain impedance is modulated by charge accumulated on the gate electrode 19. With proper charge polarity and density the source-drain impedance is decreased to as low as hundreds or even tens of ohms by inducing or collecting charge of opposite polarity to that on the gate electrode in the region between the source and drain electrodes. With proper external circuitry this provides high-level output signals analogous to high gain amplification of a low level signal.

Although crystals 9 of the type described above are inherently transient-responding or A.C.-type devices, a steady signal may also be produced in the external circuit when measuring a steady physical condition such as static fluid pressure. This is because the charge which appears on the electrodes 11 and 13 of crystal 9 also appears on the source and gate electrodes 17 and 19 where it remains (because only negligibly small leakage paths are present) until the physical condition which produced the charge on the electrodes 11, 13 of crystal 9 is removed or reversed. This charge on the gate electrode 19 determines the electron flow through the space charge region between the source and drain electrodes and hence determines the steady current in the external circuit.

In the device configuration illustrated and discussed above, only two connecting leads 27 and 29 are provided to connect the device to external circuitry. It should be understood, however, that a third connecting lead attached to the gate electrode 19 may also be provided for applications requiring an external circuit connection to the gate electrode.

I claim:

1. A solid state transducer comprising:
 a quartz crystal having a shield-electrode disposed on upper and side surfaces of said crystal and having another electrode disposed on a lower surface thereof;
 a field-effect transistor having a body portion including source and drain electrodes and having a gate electrode which is insulated from said body portion;
 means connecting the shield-electrode of said crystal to the source electrode of said transistor;
 means connecting said other electrode of said crystal to said gate electrode of said transistor;
 means sealing the crystal and body of said transistor together; and
 means providing electrical connections to said source and drain electrodes of said transistor;
 whereby an external circuit is connectable to said electrical connections for producing an indication of external force exerted upon said crystal.

2. A solid state transducer comprising:
 an element having surface electrodes and acting to produce electrical charge on said electrodes in response to a selected physical condition applied thereto, one of said electrodes being disposed on at least the portion of the surface of said element exposed to the applied physical condition;

a field-effect transistor having a body portion including source and drain electrodes and having a gate electrode insulated from said body portion;

means connecting said one electrode of said element to the source electrode of said transistor;

means connecting another electrode of said element to said gate electrode of said transistor;

means sealing the element and body portion of said transistor together; and means providing electrical connections to said source and drain electrodes;

whereby an external circuit is connectable to said electrical connections for producing an indication of said selected physical condition applied to the element.

3. A solid state transducer comprising:

a piezoelectric element having surface electrodes for producing electrical charge on said electrodes in response to fluid pressure applied thereto;

a field-effect transistor having an insulated gate electrode and source and drain electrodes;

means connecting the surface electrodes of said elements to said gate electrode and to one of said source and drain electrodes of said transistor;

means sealing said element and said transistor together; and means providing electrical connections to said source and drain electrodes;

whereby an external circuit is connectable to said electrical connections for producing an indication of the fluid pressure applied to said element.

4. A solid state transducer comprising:

an element which produces electrical charge in response to a selected physical condition applied thereto;

a transistor having a pair of electrodes forming a current conduction path and having an input electrode for controlling current in said conduction path;

means connecting said element and said transistor for applying the charge from said element to said input electrode and one of said pair of electrodes;

means sealing said element and transistor together; and means providing electrical connections to said pair of electrodes;

whereby an external circuit is connectable to said electrical connections for producing an indication of the selected physical condition applied to said element.

References Cited by the Examiner

UNITED STATES PATENTS

| | | | |
|---|---|---|---|
| 2,554,270 | 5/1951 | Rosenberg | 310—9.4 |
| 2,952,786 | 8/1960 | Lewis | 310—8.9 |
| 3,164,004 | 1/1965 | King | 310—8.9 |
| 3,209,081 | 8/1965 | Ducote | 179—107 |

MILTON O. HIRSHFIELD, *Primary Examiner.*

J. D. MILLER, *Assistant Examiner.*